(12) United States Patent
Jagannath et al.

(10) Patent No.: US 8,612,614 B2
(45) Date of Patent: Dec. 17, 2013

(54) METHOD AND SYSTEM FOR ESTABLISHING A DEDICATED SESSION FOR A MEMBER OF A COMMON FRAME BUFFER GROUP

(75) Inventors: Arvind Jagannath, Santa Clara, CA (US); Jon Nelson Thies, Malvern, PA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 558 days.

(21) Appl. No.: 12/174,881

(22) Filed: Jul. 17, 2008

(65) Prior Publication Data

US 2010/0017526 A1 Jan. 21, 2010

(51) Int. Cl.
*G06F 15/16* (2006.01)

(52) U.S. Cl.
USPC ........... 709/229; 709/203; 709/226; 709/227; 709/228

(58) Field of Classification Search
USPC .......................... 709/203, 229, 228, 227, 226
See application file for complete search history.

(56) References Cited

U.S. PATENT DOCUMENTS

| | | |
|---|---|---|
| 5,375,200 A | 12/1994 | Dugan et al. |
| 5,408,261 A | 4/1995 | Kamata et al. |
| 5,408,659 A | 4/1995 | Cavendish et al. |
| 5,446,902 A | 8/1995 | Islam |
| 5,522,025 A | 5/1996 | Rosenstein |
| 5,668,997 A | 9/1997 | Lynch-Freshner et al. |
| 6,040,832 A | 3/2000 | Poreh et al. |
| 6,262,735 B1 | 7/2001 | Etelapera |
| 6,285,364 B1 | 9/2001 | Giordano et al. |
| 6,363,065 B1 | 3/2002 | Thornton et al. |
| 6,427,233 B1 | 7/2002 | Lee et al. |

(Continued)

FOREIGN PATENT DOCUMENTS

| | | |
|---|---|---|
| CN | 1882006 A | 12/2006 |
| WO | WO-97/13352 | 4/1997 |

OTHER PUBLICATIONS

"Private Integrated Services Network (PISN); Inter-exchange signalling protocol; Path replacement additional network feature [ISO/IEC 13874 (1995) modified]," ETSI European Telecommunication Standard, ETS 300 259, Second Edition, Nov. 1995, 5 pages.
Australian Examination Report on 2007307915 dated Aug. 5, 2011.

(Continued)

*Primary Examiner* — Firmin Backer
*Assistant Examiner* — Jonathan Bui
(74) *Attorney, Agent, or Firm* — Foley & Lardner LLP; Christopher J. McKenna

(57) ABSTRACT

A method for establishing a dedicated session for a member of a common frame buffer group includes the step of transmitting, by a server agent, via at least one frame buffer channel, a first frame buffer update to each generated by one of the plurality of associated clients. The method includes the step of detecting an event generated by one of the plurality of associated clients. The method includes the step of removing, by the server agent, the one of the plurality of associated clients, from the plurality of associated clients. The method includes the step of establishing, by the server agent, a second frame buffer channel between the removed one of the plurality of associated clients and the server agent. The method includes the step of transmitting a second frame buffer update, by the server agent, to the removed one of the plurality of associated clients via the second frame buffer channel.

23 Claims, 8 Drawing Sheets

(56) References Cited

U.S. PATENT DOCUMENTS

| | | |
|---|---|---|
| 6,750,858 B1 | 6/2004 | Rosenstein |
| 6,859,928 B2 | 2/2005 | Wright |
| 6,980,641 B1 | 12/2005 | Stanford et al. |
| 7,003,327 B1 | 2/2006 | Payne et al. |
| 7,019,757 B2 | 3/2006 | Brown et al. |
| 7,221,748 B1 | 5/2007 | Moore et al. |
| 7,333,976 B1 | 2/2008 | Auerbach et al. |
| 7,441,181 B2 | 10/2008 | Yamada et al. |
| 7,451,406 B2 | 11/2008 | Yoon |
| 7,555,108 B2 | 6/2009 | Sylvain |
| 7,600,267 B2 | 10/2009 | Bauchot et al. |
| 7,688,817 B2 | 3/2010 | Celi et al. |
| 7,720,207 B2 | 5/2010 | Stanford et al. |
| 7,895,209 B2 | 2/2011 | Spence et al. |
| 2001/0005382 A1 | 6/2001 | Cave et al. |
| 2001/0018715 A1 | 8/2001 | Stern et al. |
| 2002/0007374 A1* | 1/2002 | Marks et al. ............. 707/513 |
| 2002/0054671 A1 | 5/2002 | Wiener et al. |
| 2002/0118231 A1 | 8/2002 | Smith et al. |
| 2002/0130880 A1 | 9/2002 | Holtslag et al. |
| 2002/0136206 A1 | 9/2002 | Gallant et al. |
| 2002/0137490 A1 | 9/2002 | Gallant |
| 2002/0167946 A1 | 11/2002 | Gallant |
| 2003/0058266 A1 | 3/2003 | Dunlap et al. |
| 2003/0058858 A1* | 3/2003 | Berlyoung et al. ......... 370/390 |
| 2003/0074647 A1 | 4/2003 | Andrew |
| 2003/0095542 A1 | 5/2003 | Chang et al. |
| 2003/0142108 A1 | 7/2003 | Brown et al. |
| 2003/0165140 A1* | 9/2003 | Tang et al. ............. 370/393 |
| 2004/0095401 A1 | 5/2004 | Tomimori |
| 2004/0165713 A1 | 8/2004 | Leighton |
| 2004/0239701 A1 | 12/2004 | Crichton |
| 2005/0057498 A1 | 3/2005 | Gentle |
| 2005/0117737 A1 | 6/2005 | Stanford et al. |
| 2005/0125543 A1 | 6/2005 | Park et al. |
| 2005/0278626 A1 | 12/2005 | Malik |
| 2006/0026288 A1 | 2/2006 | Acharya et al. |
| 2006/0048073 A1 | 3/2006 | Jarrett et al. |
| 2006/0095397 A1 | 5/2006 | Torres et al. |
| 2006/0224989 A1 | 10/2006 | Pettiross et al. |
| 2007/0021981 A1 | 1/2007 | Cox |
| 2007/0030245 A1 | 2/2007 | Ngari et al. |
| 2007/0143414 A1 | 6/2007 | Daigle |
| 2007/0201493 A1 | 8/2007 | Yamada et al. |
| 2007/0233891 A1* | 10/2007 | Luby et al. ............. 709/231 |
| 2007/0253643 A1 | 11/2007 | Nagarajan |
| 2008/0031228 A1 | 2/2008 | Gallant |
| 2008/0059646 A1* | 3/2008 | Ludvig et al. ............. 709/231 |
| 2008/0081662 A1 | 4/2008 | Strandell et al. |
| 2008/0256563 A1 | 10/2008 | Han |
| 2008/0276267 A1* | 11/2008 | Badt et al. ............. 725/32 |
| 2008/0281971 A1 | 11/2008 | Leppanen et al. |
| 2008/0313669 A1* | 12/2008 | Acharya et al. ............. 725/34 |
| 2009/0022283 A1 | 1/2009 | Pollitt |
| 2009/0025042 A1* | 1/2009 | Lubbers et al. ............. 725/70 |
| 2009/0044242 A1* | 2/2009 | Ramakrishnan et al. ..... 725/118 |
| 2009/0049392 A1 | 2/2009 | Karttunen et al. |
| 2009/0052639 A1 | 2/2009 | Payne |
| 2009/0201990 A1* | 8/2009 | Leprovost et al. ....... 375/240.12 |
| 2009/0238174 A1 | 9/2009 | Veenstra et al. |
| 2009/0265746 A1* | 10/2009 | Halen et al. ............. 725/109 |
| 2009/0268720 A1 | 10/2009 | Veenstra et al. |
| 2010/0141552 A1 | 6/2010 | Ferlitsch et al. |
| 2011/0047476 A1* | 2/2011 | Hochmuth et al. ........... 715/744 |

OTHER PUBLICATIONS

Australian Examination Report on 2008289047 dated Apr. 18, 2011.
Bobola, Daniel T., "The Complete Idiot's Guide to Microsoft Word 2000", 1999, pp. 15, 121, 166, 244, 278-281.
Non Final Office Action regarding U.S. Appl No. 11/539,515 mailed on Jul. 13, 2011.
Non Final Office Action regarding U.S. Appl. No. 11/843,509 mailed on Nov. 23, 2010.
Final Office Action regarding U.S. Appl. No. 11/843,510 mailed on Nov. 26, 2010.
Non Final Office Action regarding U.S. Appl. No. 11/843,513 dated Jun. 22, 2011.
European Examination Report on 08798180.9 dated Mar. 20, 2012.
International Search Report from PCT/US2008/073586, dated Nov. 18, 2008, 4 pages.
Office Action on U.S. Appl. No. 11/539,515 dated Apr. 11, 2012.
Office Action on U.S. Appl. No. 11/539,515 dated Dec. 20, 2011.
Office Action on U.S. Appl. No. 11/843,514 dated Oct. 27, 2011.
Office Action on U.S. Appl. No. 11/843,514 dated May 11, 2011.
Office Action on U.S. Appl. No. 11/843,516 dated Mar. 18, 2011.
Office Action on U.S. Appl. No. 11/843,516 dated Nov. 7, 2011.
Office Action on U.S. Appl. No. 12/341,779 dated Aug. 2, 2011.
Office Action on U.S. Appl. No. 12/341,797 dated Dec. 5, 2011.
Office Action on U.S. Appl. No. 12/341,809 dated Aug. 3, 2011.
Office Action on U.S. Appl. No. 12/341,919 dated Oct. 11, 2011.
Written Opinion of the International Searching Authority, from PCT/US2008/073586, dated Nov. 18, 2008, 7 pages.
Chinese Office Action on 200880103712.9 dated May 31, 2012.
Chinese Office Action on 200880103746.8 dated Aug. 9, 2012.
Notice of Allowance on U.S. Appl. No. 11/843,513 dated Aug. 3, 2012.

* cited by examiner

METHOD AND SYSTEM FOR ESTABLISHING A DEDICATED SESSION FOR A MEMBER OF A COMMON FRAME BUFFER GROUP

FIELD OF THE DISCLOSURE

The present invention relates to methods and systems for supporting sessions for frame buffer groups. In particular, the present invention relates to methods and systems for establishing a dedicated session for a member of a common frame buffer group.

BACKGROUND OF THE DISCLOSURE

In some environments, a plurality of client devices are associated with each other to form common frame buffer groups and to share a common session for the duration of an event, such as a presentation or one or more paging events. These client devices typically execute a frame buffer client application for displaying received frame buffer updates. Client devices that may join a common frame buffer group include, for example, remote terminals receiving presentations over the Internet from a server and Internet Protocol (IP) phones receiving a paging event over a hotel Local Area Network (LAN). A typical implementation includes a gateway or server agent transmitting frame buffer updates to the client devices over a network. The gateway or server agent also hosts, or is in communication with, an instance of the application associated with each client and responsible for performing application processing on behalf of the associated client. Each application instance typically has a dedicated frame buffer connection to the client, via the gateway or server agent, for transmitting updates to the client.

The disadvantages of such an implementation include that each frame buffer update—each presentation frame or phone page—requires the creation of separate application processes and the transmission of separate frame buffer updates to the application gateway or server agent. This typically results in significant computer processing usage and bandwidth overhead, as well as increased latency in displaying the frame buffer updates at each receiving client device. The above implementation may also lead to limitations in scalability and system performance issues above a threshold number of clients.

BRIEF SUMMARY OF THE DISCLOSURE

In one aspect, a method for establishing a dedicated session for a member of a common frame buffer group includes the step of transmitting, by a server agent, via at least one frame buffer channel, a first frame buffer update to each of a plurality of associated clients. The method includes the step of detecting an event generated by one of the plurality of associated clients. The method includes the step of removing the one of the plurality of associated clients, from the plurality of associated clients. The method includes the step of establishing by the server agent, a second frame buffer channel between the removed one of the plurality of associated clients and the server agent. The method includes the step of transmitting a second frame buffer update, by the server agent, to the removed one of the plurality of associated clients via the second frame buffer channel.

In one embodiment, the method includes the steps of adding the removed one of the plurality of associated clients and transmitting a third frame buffer update to the plurality of associated clients via the at least one frame buffer channel. In another embodiment, the method includes the step of multicasting, by the server agent, the first frame buffer update via at least one frame buffer channel to each of the plurality of associated clients. In still another embodiment, the method includes the step of transmitting, by the server agent, via a plurality of frame buffer channels, the first frame buffer update to each of the plurality of associated clients. In yet another embodiment, the method includes the step of establishing each of the plurality of frame buffer channels between one of the plurality of associated clients and the server agent.

In one embodiment, the method includes the step of transmitting, by the server agent, a frame buffer update representative of a paging event to each of the plurality of associated clients via the at least one frame buffer channel. In another embodiment, the method includes the step of detecting a first event comprising a response to the paging event.

In one embodiment, the method includes the step of removing an Internet protocol address associated with the removed one of the plurality of associated clients from a multicast Internet protocol address. In another embodiment, the method includes the step of receiving, by the server agent, a frame buffer update generated by an application in communication with the server agent, the frame buffer update representative of output data generated by the application.

In one embodiment, the method includes the step of modifying a frame panel associated with each of the plurality of associated clients in response to the detection of the event. In another embodiment, the method includes the step of generating the second frame buffer update representative of the modified frame panel.

In one embodiment, the method includes the step of generating the second frame buffer update in response to the detected event, by an application in communication with the server agent. In another embodiment, the method includes the step of receiving an event representative of user interaction with one of the plurality of associated clients, by the server agent.

In one embodiment, the method includes the step of executing a frame buffer client, by each of the plurality of associated clients. In another embodiment, the method includes the step of generating a display with the frame buffer client. In still another embodiment, the method includes the step of updating the display in response to receiving a frame buffer update from the server agent.

In one embodiment, the method includes the step of transmitting, by the server agent to an application, the event generated by the one of the plurality of associated clients, via a frame buffer channel between the server agent and the application.

In another aspect, a system for establishing a dedicated session for a member of a common frame buffer group includes a server agent and a plurality of associated clients. The server agent establishes at least one frame buffer channel with each of a plurality of associated clients, removes one of the plurality of associated clients from the plurality of associated clients, establishes a second frame buffer channel with the removed one of the plurality of associated clients, and transmits a second frame buffer update via the second frame buffer channel.

In one embodiment, the server agent executes on a gateway. In another embodiment, the server agent executes on a server. In yet another embodiment, the system includes a frame buffer generator, in communication with the server agent, generating the at least one frame buffer update. In still yet another embodiment, the system includes a plurality of frame buffer channels, each of the plurality of frame buffer channels established between one of the plurality of associated clients and the server agent.

In one embodiment, the system includes a frame buffer update representative of a paging event. In another embodiment, the system includes a frame buffer update representative of output data generated by an application in communication with the server agent. In still another embodiment, the system includes a frame buffer client executing on each of the plurality of associated clients and generating a display updated in response to receiving a frame buffer update from the server agent. In yet another embodiment, the system includes a frame buffer generator identifying an event representative of user interaction with one of the plurality of associated clients.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
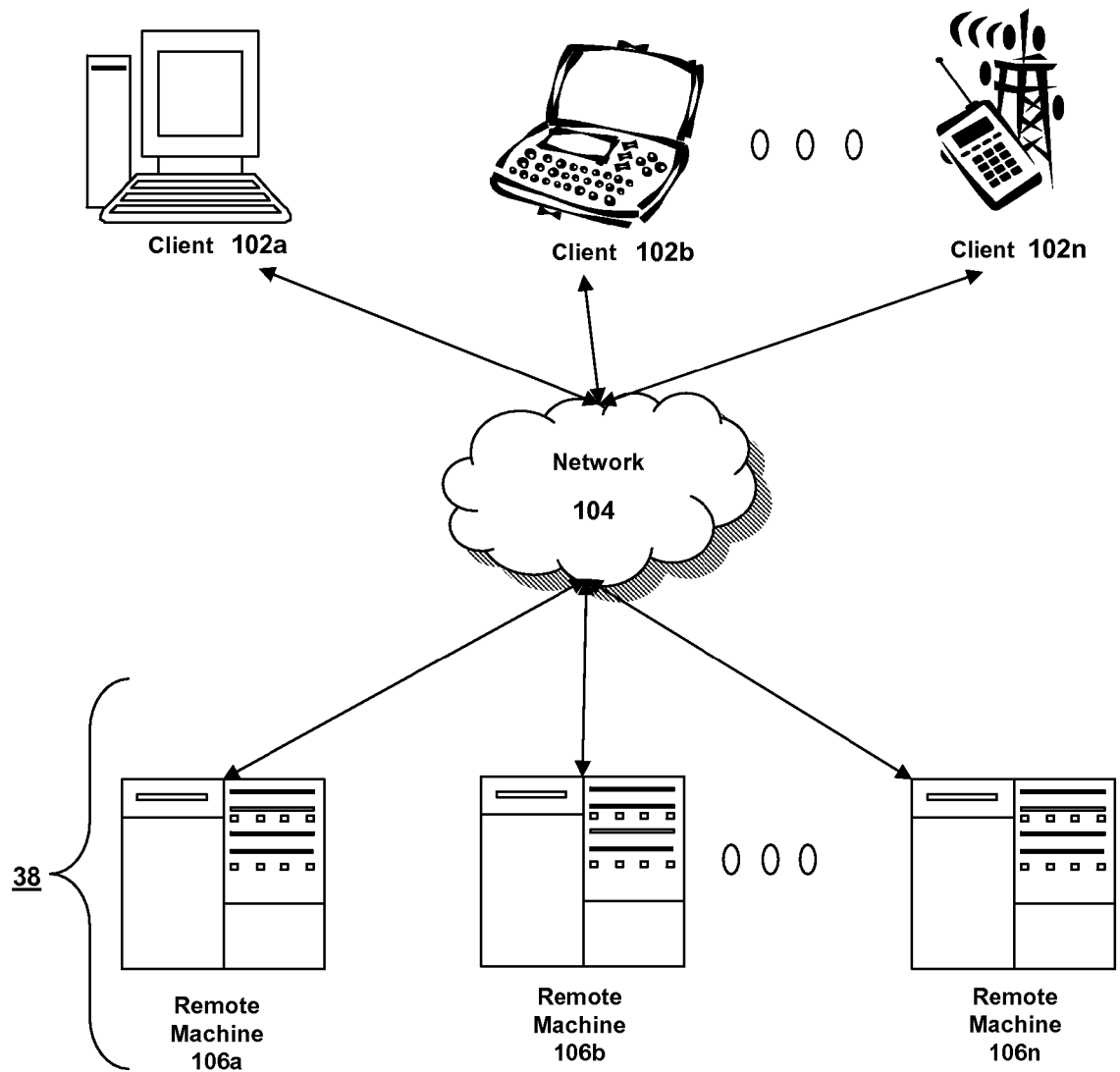
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38. In another of these embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

Server 106 may be a file server, application server, web server, proxy server, appliance, network appliance, gateway, gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a server 106. In one embodiment, the client 102 communicates directly with one of the servers 106 in a server farm 38. In another embodiment, the client 102 executes a program neighborhood application to communicate with a server 106 in a server farm 38. In still another embodiment, the server 106 provides the functionality of a master node. In some embodiments, the client 102 communicates with the server 106 in the server farm 38 through a network 104. Over the network 104, the client 102 can, for example, request execution of various applications hosted by the servers 106a-106n in the server farm 38 and receive output of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a JAVA applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
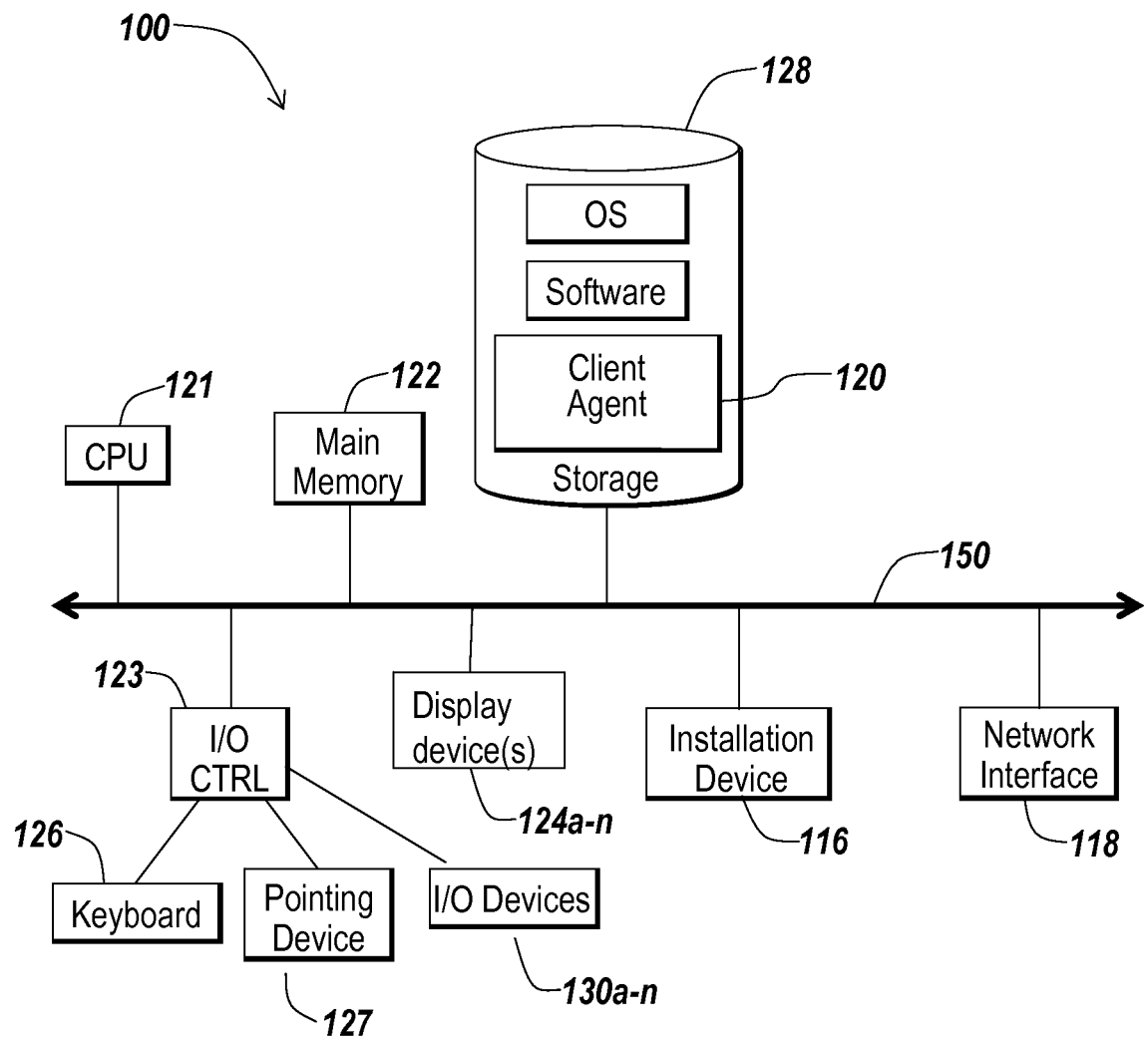
FIGS. 1B and 1C are block diagrams depicting embodiments of computers useful in connection with the methods and systems described herein.
Figure 1C:
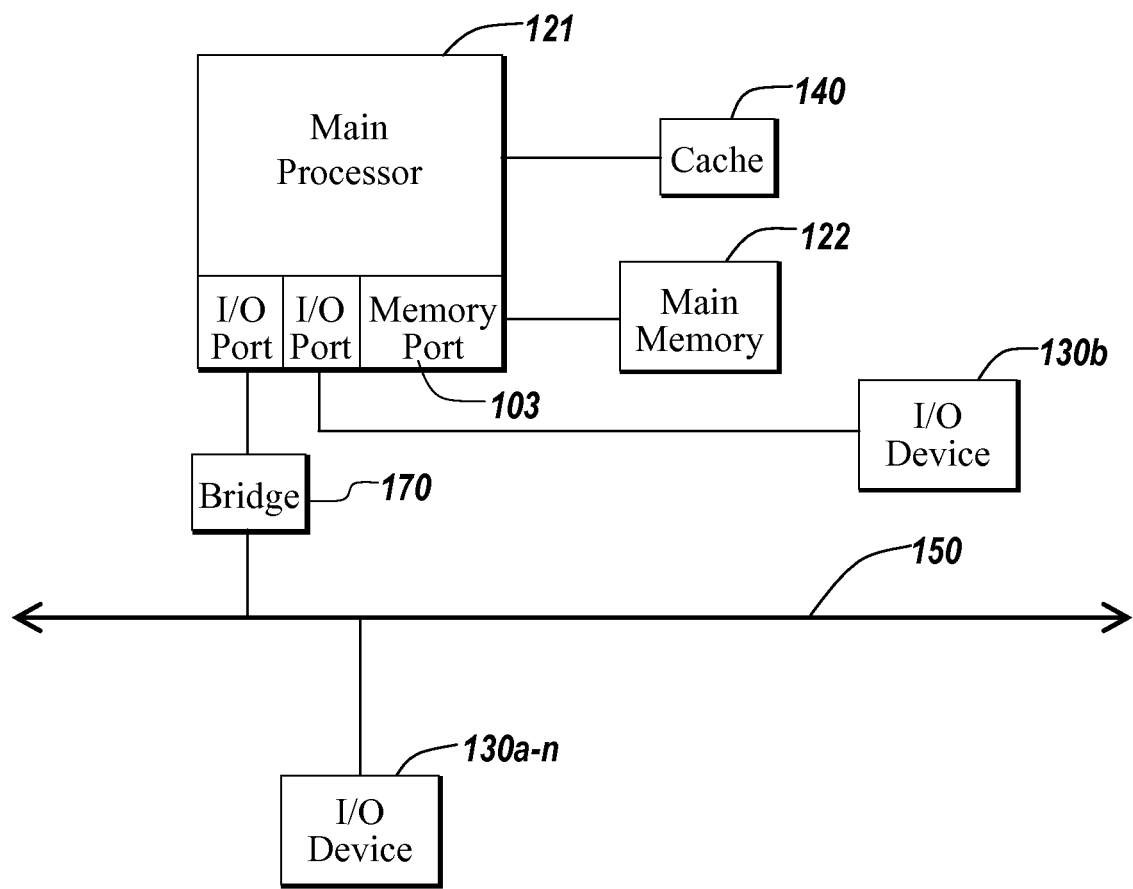

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2A:
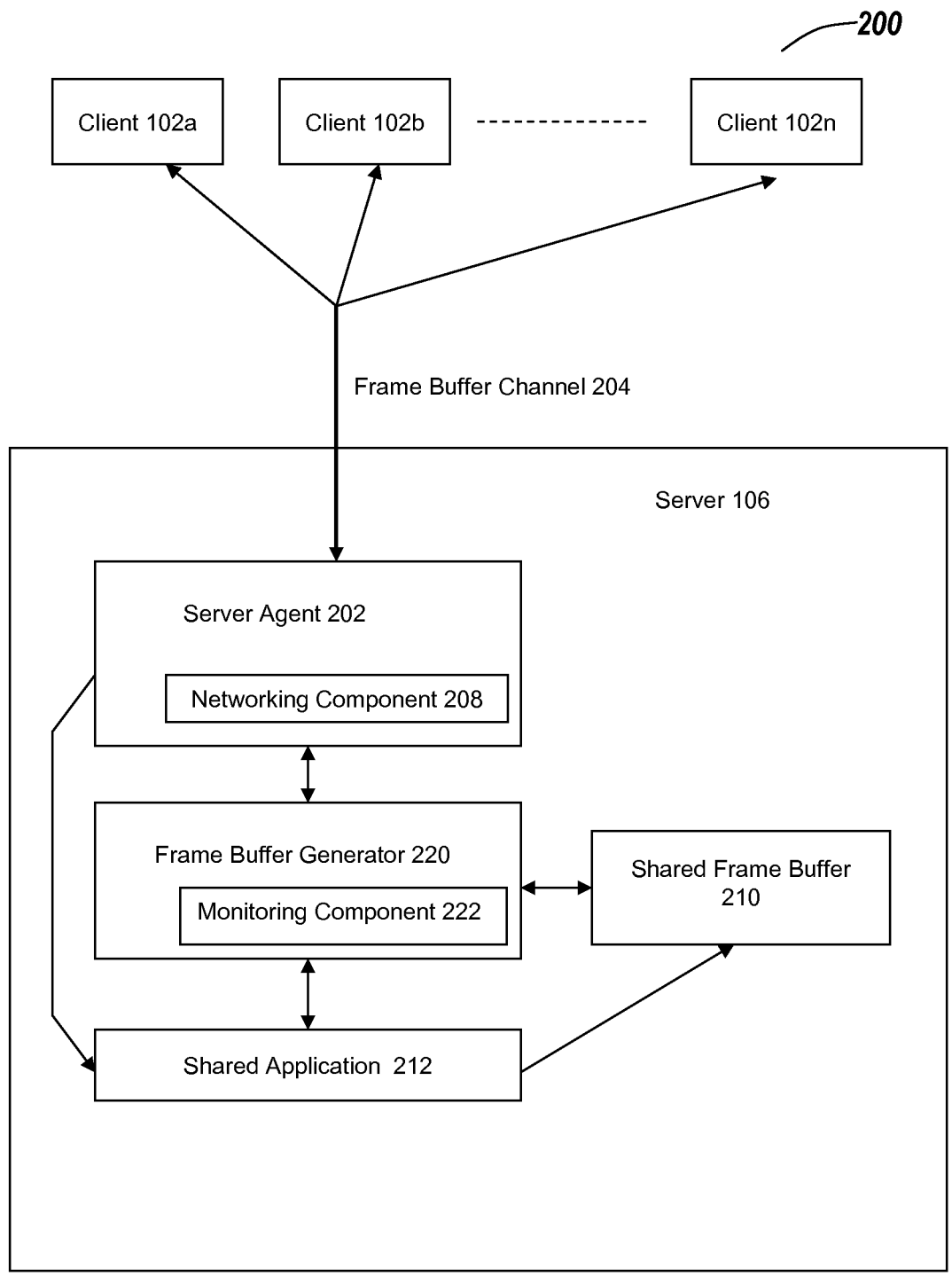
FIG. 2A is a block diagram depicting an embodiment of a system for establishing a dedicated session for a client removed from a common frame buffer group and enabling the removed client to rejoin the common frame buffer group.

Referring now to FIG. 2A, a block diagram depicts an embodiment of a system 200 for establishing a dedicated session for a client 102n removed from a common frame buffer group 102a-102n and enabling the removed client 102n to rejoin the common frame buffer group 102a-102n. In brief overview, the system 200 includes a plurality of associated clients 102a-102n in communication with a server 106 via a frame buffer channel 204. The system 200 includes a server agent 202, which communicates with each of the plurality of associated clients 102a-102n, a shared frame buffer 210, a frame buffer generator 220, and a shared application 212. In another embodiment, more than one frame buffer channel (not shown) may exist between the server 106 and the plurality of associated clients 102a-102n.

In one embodiment, the plurality of associated clients 102a-102n comprise IP phones, computer terminals, wireless receivers, or any computing device 100 as described above in connection with FIGS. 1A-C. In another embodiment, the plurality of associated clients 102a-102n is heterogeneous in device type, receives frame buffer updates and shares a common frame buffer group. In yet another embodiment, the plurality of associated clients 102a-102n is homogeneous in device type, receives frame buffer updates and shares a common frame buffer group.

In one embodiment, the plurality of clients 102a-102n are associated by a single IP address. In another embodiment, one or more of the plurality of associated clients 102a-102n are assigned to distinct IP addresses; for example, the plurality of associated clients 102a-102n may be uniquely addressable as a group with a subnetwork address mask. In other embodiments, unique device IDs, such as host IDs, allow the plurality of associated clients 102a-102n to be identifiable and addressable over a network. In yet other embodiments, the plurality of associated clients 102a-102n are identifiable and addressable by client attributes, such as port attributes indicating that ports on the clients are open. Such attributes may be set by a system administrator through the shared application 212 for example, or by individual clients.

In one embodiment, the server agent 202 establishes at least one frame buffer channel 204 with each of the plurality of associated clients 102a-102n. In another embodiment, the server agent 202 removes one of the plurality of associated clients from the plurality of associated clients 102a-102n. In still another embodiment, the server agent 202 establishes, with the removed one of the plurality of associated clients, a second frame buffer channel 204'. In yet another embodiment, the server agent 202 transmits, via the second frame buffer channel 204', a second frame buffer update 224.

Referring still to FIG. 2A, and in greater detail, in one embodiment, the server agent 202 executes on the server 106. In another embodiment (not shown), the server agent 202 executes on a gateway. In still another embodiment, the server agent 202 executes on a computing device 100, such as a computing device described above in connection with FIGS. 1A-C.

In one embodiment, the server agent 202 includes a networking component 208. In another embodiment (not shown), the server agent 202 is in communication with a networking component 208. In one embodiment, the networking component 208 establishes at least one frame buffer channel 204 with each of the plurality of associated clients 102a-102n. In another embodiment, the networking component 208 removes one of the plurality of associated clients 102n from the plurality of associated clients 102a-102n. In still another embodiment, the networking component 208 establishes, with the removed one of the plurality of associated clients 102n, a second frame buffer channel 204'. In yet another embodiment, the networking component 208 transmits, via the second frame buffer channel 204', a second frame buffer update 224.

In some embodiments, the frame buffer channel 204 is discrete from another frame buffer channel 204'. In other embodiments, the frame buffer channel 204 is multiplexed either physically, optically, electrically or wirelessly with another frame buffer channel 204'. In still other embodiments, the frame buffer channel 204 transmits data between the server 106 and the plurality of associated clients 102a-102n In one embodiment, the transmitted data is application output data generated from the shared application 212. In another embodiment, the transmitted data is representative of a mouse click event from one of the plurality of associated clients 102a-102n. In still another embodiment, the transmitted data includes coordinates of a screen location on which the user has clicked using a pointing and input device such as a mouse. In still even another embodiment, the transmitted data is representative of a keyboard event from one of the plurality of associated clients 102a-102n. In yet another embodiment, the transmitted data includes a key value entered on a keyboard.

In some embodiments, the transmitted data is graphical data. In one of these embodiments, the transmitted data includes pixel information corresponding to a changed region of a screen. In another embodiment, the transmitted data includes dimensions of a rectangular region corresponding to a changed region of a screen. In still another embodiment, a changed region of a screen is represented by a plurality of rectangular regions, each of different dimensions. In yet another embodiment, the transmitted data includes a list representing the plurality of rectangular regions and their corresponding dimension and pixel information. In still even another embodiment, the transmitted data is used to update the display of at least one of the plurality of associated clients 102a-102n.

In one embodiment, there is a single frame buffer channel 204 and the server 106 multicasts data to each of the plurality of associated clients 102a-102n via the frame buffer channel 204. In another embodiment, there is a plurality of frame buffer channels 204.

In one embodiment, the monitoring component 222 is a component in the frame buffer generator 220 as shown in FIG. 2A. In another embodiment, the monitoring component 222 is a component in the server agent 202. In still another embodiment, the monitoring component 222 is in communication with the frame buffer generator 220. In yet another embodiment, the monitoring component 222 is in communication with the shared application 212 and detects a change generated by the shared application 212 to the shared frame buffer 210.

In some embodiments, a frame buffer update is stored in a shared frame buffer 210 as shown in FIG. 2A. In one embodiment, the shared frame buffer 210 comprises memory as described above in connection with FIGS. 1B and 1C. In another embodiment, the frame buffer update 210 is stored in a database on a storage device as described above in connection with FIGS. 1B and 1C. In still another embodiment, the frame buffer update 210 resides on the server 106. In yet another embodiment, the frame buffer update 210 resides on a bank of registers. In still even another embodiment, the frame buffer 210 resides on a second server 106'.

FIG. 2A shows a system 200 with the frame buffer generator 220 in communication with the shared frame buffer 210. In one embodiment, the frame buffer generator 220, in communication with the monitoring component 222, generates one or more frame buffer updates responsive to data retrieved from the shared frame buffer 210. In another embodiment, the frame buffer generator 220, in communication with the server agent 202, generates one or more frame buffer updates for transmission to the plurality of associated clients 102a-102n. In still another embodiment, the frame buffer generator 220, in communication with the shared application 212, generates one or more frame buffer updates for transmission to the plurality of associated clients 102a-102n.

In one embodiment, the frame buffer update represents a paging event. In another embodiment, the frame buffer update represents output data generated by the shared application 212 in communication with the server agent 202. In still another embodiment, the frame buffer update represents output data generated by the shared application 212 in communication with the frame buffer generator 220. In yet another embodiment, the frame buffer update represents output data generated by the shared application 212 in communication with the networking component 208. In still even another embodiment, the frame buffer update represents output data generated by the shared application 212 in response to an administrative event or a preprogrammed event.

In one embodiment, the plurality of associated clients 102a-102n receive the same frame buffer update via the networking component 208 as shown in FIG. 2A. This has the effect of multicasting the same frame to the plurality of associated clients 102a-102n. In another embodiment where the networking component 208 resides outside the server agent 202, the networking component 208 directs the frame buffer update from the server agent 202 onto the associated frame buffer channel(s) 204, to the receiving clients 102a-102n.

In one embodiment as shown in FIG. 2A, the frame buffer generator 220, the shared frame buffer 210, and the shared application 212 all reside within server 106. In another embodiment, these components, in combination or alone, can reside beyond the boundaries of server 106 within the network on another server 106' for example.

In one embodiment, the system comprises a frame buffer client (not shown) executing on each of the plurality of associated clients 102a-102n. In another embodiment, the frame buffer client generates an updated display responsive to receiving a frame buffer update from the networking component 208.

Figure 2B:
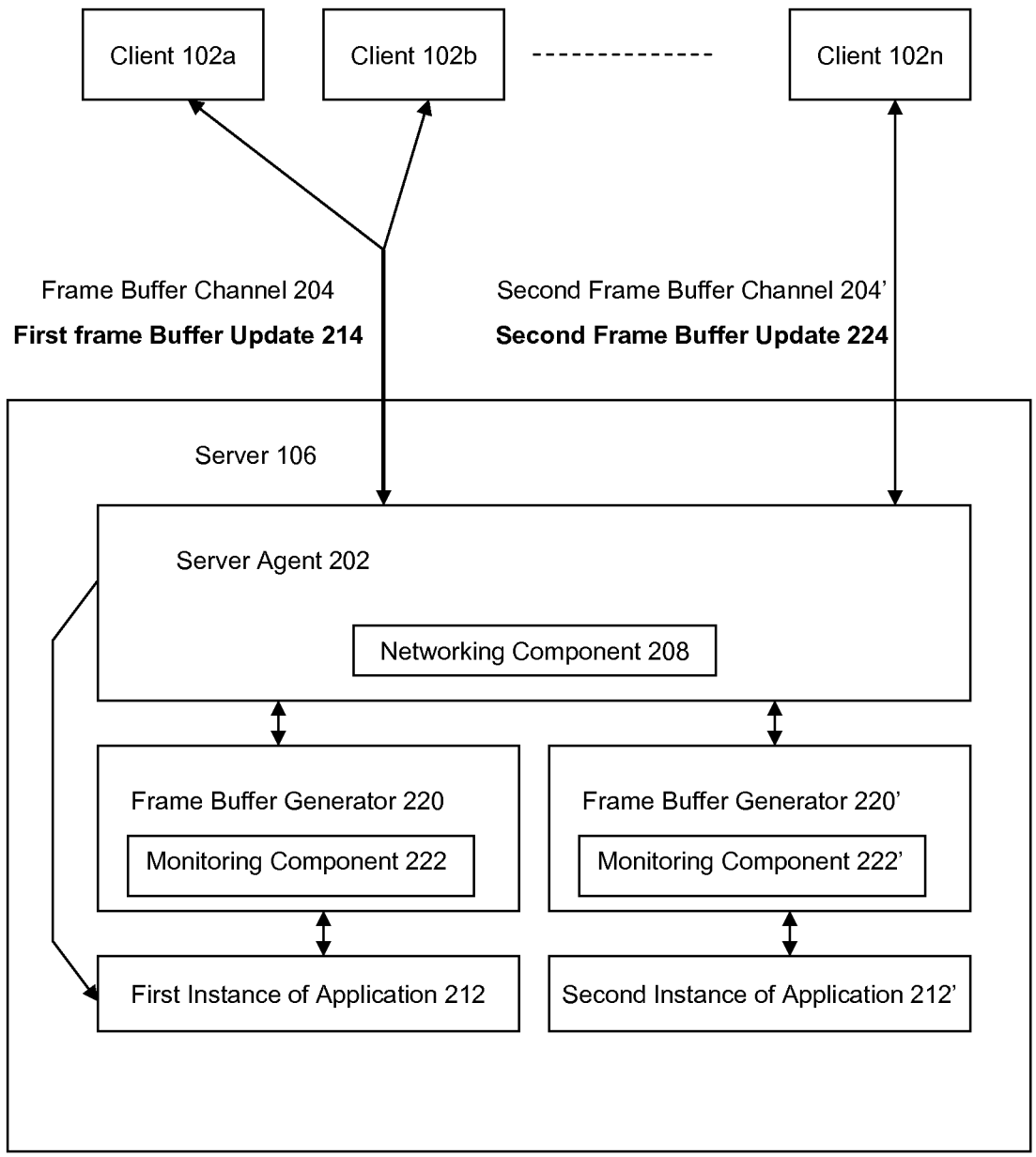
FIG. 2B is a block diagram depicting an embodiment of a system for establishing a dedicated session for a client removed from a common frame buffer group.

Referring now to FIG. 2B, a block diagram depicts one embodiment of a system for establishing a dedicated session for a client 102n removed from a common frame buffer group. In one embodiment, detection of a triggering event causes the creation of a second instance of the application 212'. In another embodiment, responsive to detecting the event, a second instance of the frame buffer generator 220' is created. In still another embodiment, responsive to detecting the event, the networking component 208 establishes a second frame buffer channel 204' between the server agent 202 and the removed client 102n. In yet another embodiment, responsive to detecting the event, the frame buffer generator instance 220', in communication with the application instance 212', generates a second frame buffer update 224 for transmission to the removed client 102n. In some embodiments, for example, a triggering event is a mouse click on client 102n, responsive to a paging event. This triggers the transmission of the second frame buffer update 224 to the client 102n, updating the display of client 102n with page-related data.

Figure 2C:
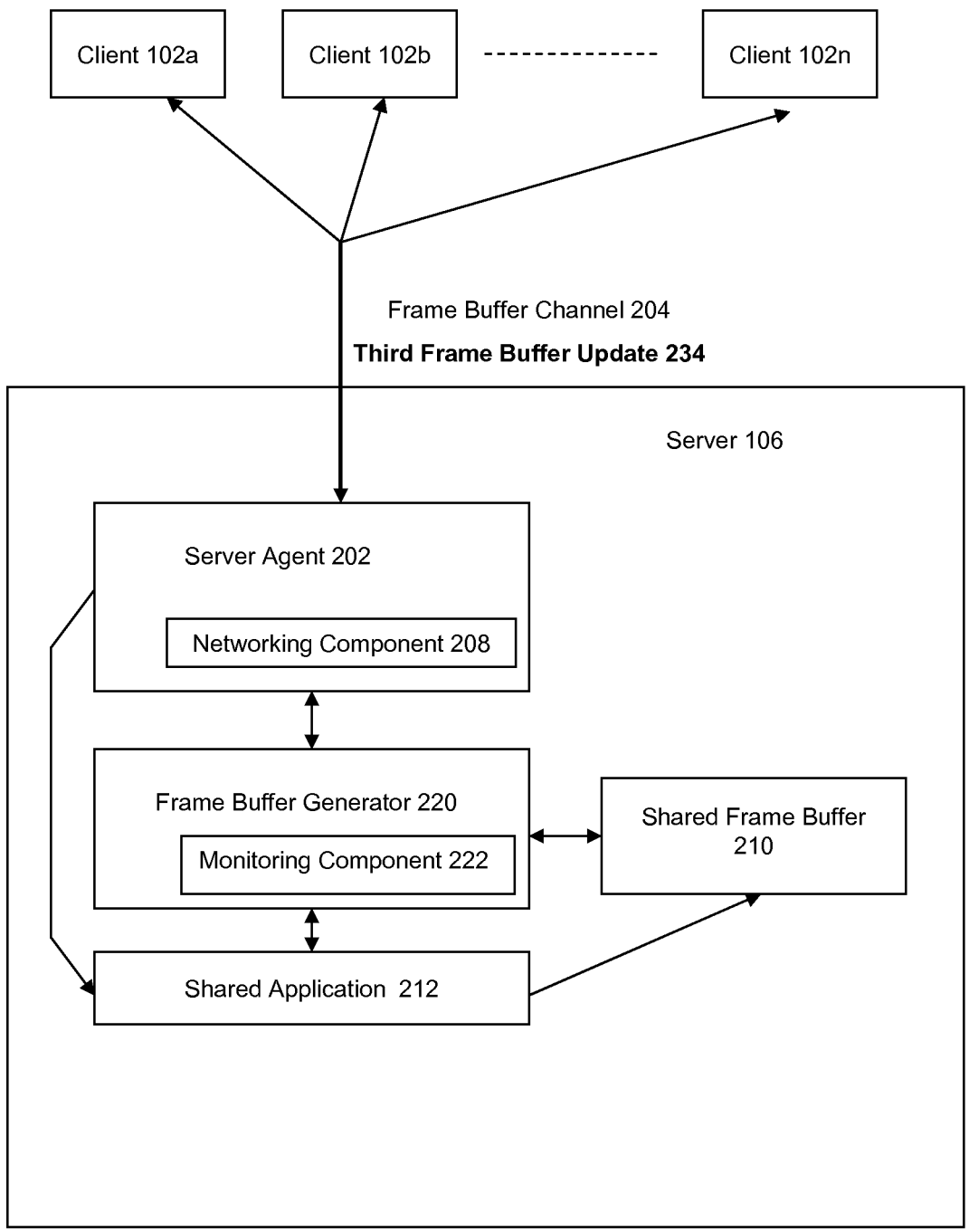
FIG. 2C is a block diagram depicting one embodiment of a system for rejoining a removed client with the common frame buffer group.

Referring now to FIG. 2C, a block diagram depicts one embodiment of a system for rejoining a removed client 102n with the common frame buffer group. In one embodiment, an event triggered on the removed client 102n results in the rejoining. In another embodiment, responsive to detecting the event, the networking component 208 disconnects the removed client 102n from its dedicated frame buffer channel 204' and reconnects it to the original frame buffer channel 204. In still another embodiment, responsive to detecting the event, the frame buffer generator 220, in communication with the shared application 212, generates a third frame buffer update for transmission to the server agent 202. In yet another embodiment, responsive to detecting the event, the server agent 202 transmits the third frame buffer update 234 onto the original frame buffer channel 204, and re-synchronizes the plurality of associated clients 102a-102n. In still even another embodiment, responsive to detecting the event, the networking component 208 transmits the third frame buffer update 234 onto the original frame buffer channel 204, re-synchronizing the plurality of associated clients 102a-102n.

Figure 3A:
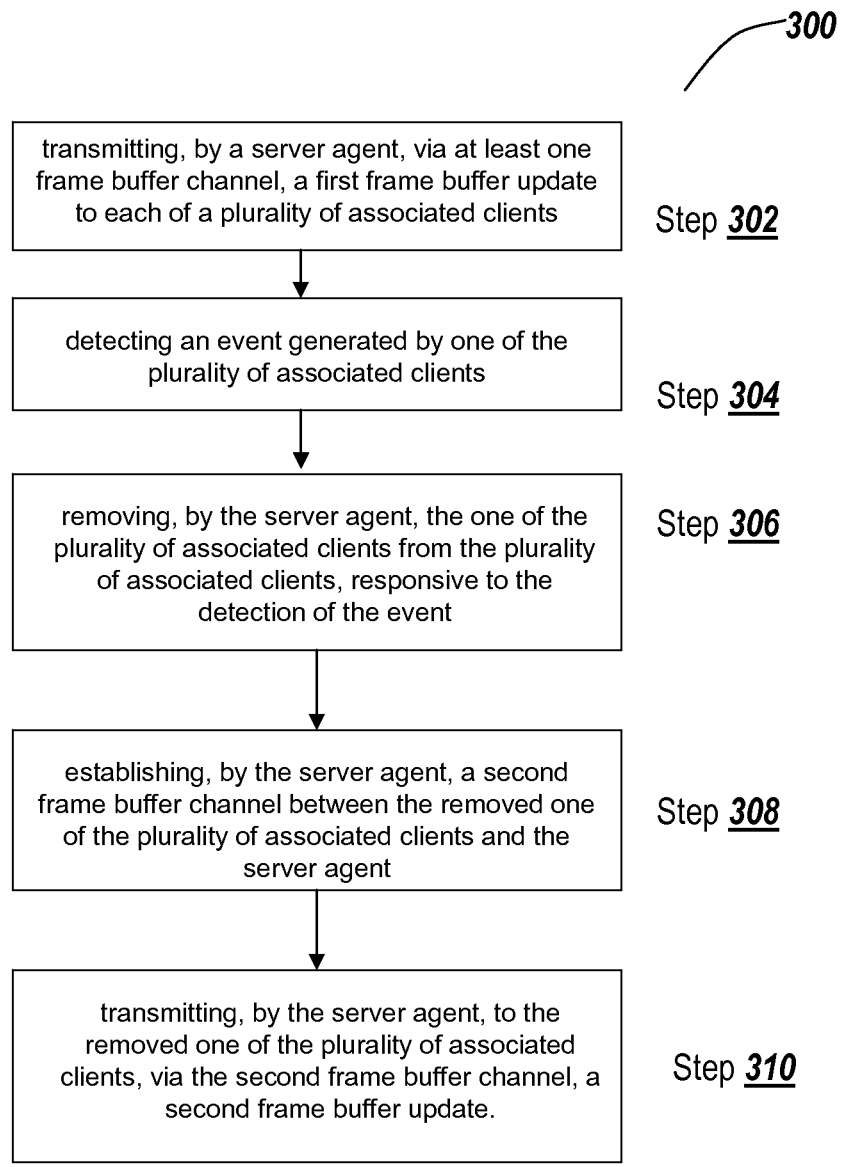
FIG. 3A is a flow diagram depicting one embodiment of the steps taken in a method for establishing a dedicated session for a client removed from a common frame buffer group.

Referring now to FIG. 3A, a flow diagram depicts one embodiment of the steps taken in a method 300 for establishing a dedicated session for a member of a common frame buffer group. In brief overview, the method includes the step of transmitting, by a server agent 202, via at least one frame buffer channel 204, a first frame buffer update to each of a plurality of associated clients 102a-102n (step 302). The method includes the step of detecting an event generated by one of the plurality of associated clients 102a-102n (step 304). The method includes the step of removing, by the server agent 202, the one of the plurality of associated clients (step 306). The method includes the step of establishing, by the server agent 202, a second frame buffer channel 204' between the removed one of the plurality of associated clients and the server agent 202 (step 308). The method includes the step of transmitting, by the server agent 202, to the removed one of the plurality of associated clients, via the second frame buffer channel 204', a second frame buffer update 224 (step 310).

Referring now to FIG. 3A, and in greater detail, the server agent 202 transmits a first frame buffer update to each of the plurality of clients 102a-102n via at least one frame buffer channel 204 (step 302). In one embodiment, the networking component 208 transmits the first frame buffer update to the plurality of clients 102a-102n.

In one embodiment, the method includes the step of receiving, by the server agent 202, a frame buffer update generated by a shared application 212 in communication with the server agent 202, frame buffer update representative of output data generated by the shared application 212. In some embodiments, the first frame buffer update represents a starting state of an application.

In one embodiment, the shared application 212 signals to the frame buffer generator 220 whenever a graphical user interface component (GUI) in the shared application 212 changes. In another embodiment, the monitoring component 222 monitors for signals from the shared application 212. In still another embodiment, the monitoring component 222 detects a signal indicative of a partial screen update to be transmitted to the plurality of associated clients 102a-102n. In yet another embodiment, the monitoring component 222 detects a signal indicative of a full screen update to be transmitted to the plurality of associated clients 102a-102n.

In one embodiment, the frame buffer generator 220 identifies an event, which triggers the generation of a frame buffer update. In another embodiment, the frame buffer generator 220 identifies an event representative of user interaction with one of the plurality of associated clients 102a-102n. In still another embodiment, the event may be initiated in real-time by the user, for example, triggered by a mouse-click or tapping of a soft-key from a client. In yet another embodiment, the frame buffer generator 220 identifies an event pre-programmed on a client, activated by a timer for example. In still even another embodiment, the frame buffer generator 220 identifies an event triggered from any entity in the system 200 with sufficient administrative privileges, such as an administrative program or user issuing a command via the shared application 212 or from anywhere on the network. In some embodiments, the frame buffer generator 220, in communication with the shared application 212, detects whether the shared application 212 has created a change to the shared frame buffer 210 that should be transmitted to the plurality of associated clients 102a-102n. In other embodiments, the server agent 202 identifies the event.

In some embodiments, the frame buffer generator 220 detects a change from the shared application 212 which requires a full update to be transmitted to the plurality of associated clients 102a-102n. In one of the embodiments, the frame buffer generator 220, responsive to detecting the change, generates a frame buffer update representative of a complete screen update to be transmitted to the plurality of associated clients 102a-102n. In other embodiments, the frame buffer generator 220 detects a change which requires a partial update to be transmitted to the plurality of associated clients 102a-102n. In one of the embodiments, the frame buffer generator 220, responsive to detecting the change, determines the graphical data to be updated and generates a frame buffer update representative of the partial update. In still other embodiments, the graphical data may include locators for rectangular regions as well as pixel information to be updated. In some embodiments, the shared application 212 decides whether a full or partial update is to be transmitted to the plurality of associated clients 102a-102n. In yet other embodiments, the frame buffer generator 220 transmits the frame buffer update to the server agent 202.

In one embodiment, the networking component 208 establishes a frame buffer channel between the server agent 202 and each of the plurality of associated clients 102a-102n, for a total of N frame buffer channels for N associated clients. In another embodiment, the networking component 208 establishes more than one frame buffer channels between the server agent 202 and at least one of the plurality of associated clients 102a-102n. In still another embodiment, the networking component 208 establishes a single channel between the server agent 202 and the plurality of associated clients 102a-102n.

In one embodiment, the networking component 208 maintains at least one frame buffer channel 204 to the plurality of associated clients 102a-102n by using a multicast IP address to transmit to each of the associated clients 102a-102n. In another embodiment, the networking component 208 associates the plurality of associated clients 102a-102n with a multicast IP address. In still another embodiment, the networking component 208 sends a command to each of the plurality of associated clients 102a-102n to open a port. In yet another embodiment, each of the plurality of associated clients 102a-102n receives multicast traffic via the open port.

In one embodiment, the server agent 202 multicasts a first frame buffer, via at least one frame buffer channel 204, to the plurality of associated clients 102a-102n. In another embodiment, the server agent 202 transmits the first frame buffer update representative of a paging event, via at least one frame buffer channel update, to the plurality of associated clients 102a-102n. In still another embodiment, the first frame buffer update is modified prior to reaching each of the clients, for example, so that the resultant format of the frame buffer update is supported by features specific to each client. In yet another embodiment, an intermediate network component between the server agent 202 and one of the plurality of associated clients 102a, modifies the first frame buffer update and forwards the modified frame buffer update to the client 102a. In still yet another embodiment, receipt of the first frame buffer update is synchronized in time across the plurality of associated clients 102a-102n.

The system detects an event generated by one of the plurality of associated clients 102n (step 304). In one embodiment, the client 102n forwards, to the server 106, an event representative of user interaction with the client 102n. In another embodiment, the server agent 202 receives an event representative of user interaction with the client 102n. In still another embodiment, the networking component 208 receives an event representative of user interaction with the client 102n. In still even another embodiment, the networking component 208 detects the event. In yet another embodiment, the server agent 202 detects the event.

In some embodiments, the server agent 202 transmits, via a frame buffer channel between the server agent 202 and the application 212, the event to the shared application 212. In one of these embodiments, receipt of the event triggers, by the frame buffer generator 220 in communication with the shared application 212, creation of a frame buffer update for the removed client 102n. In another of these embodiments, the received event is a request by a user to view a previous image on a webcast.

In some embodiments, the event is a mouse click, the pressing of a key, softkey or button, tapping of a touch pad, or any other interactive action, by a user at a client device, as described above in connection with FIGS. 2A-2C. In other embodiments, an event is pre-programmed by a user at a client device, for example, to be activated by a timer. In still other embodiments, the event comprises a response to a paging event. For example, in one of these embodiments, a client 102n receives a page directed to a plurality of associated clients 102a-102n.

The server agent 202 removes one of the clients from the plurality of associated clients 102a-102n (step 306). In one embodiment, the server agent 202 removes the client 102n in response to the detection of the event. In another embodiment, the networking component 208 removes the client 102n in response to the detection of the event.

In one embodiment, the networking component 208 removes the client 102n by resetting its IP address. In another embodiment, the networking component 208 removes the client 102n by resetting its unique device ID, with which the server agent 202 uses to address the client 102n in the network. In still another embodiment, the networking component 208 removes the client 102n by resetting an attribute on the client 102n such that the client 102n is blocked from receiving new frame buffer updates to the common buffer group. An example of such an attribute is a "port open" attribute, indicating availability of open port connections to receive incoming data to the client. In yet another embodiment, the networking component 208 removes the client 102n by removing it from a list representative of the common buffer group, the list comprising device IDs such as port numbers or host IDs, which uniquely identifies and addresses each client. In still even another embodiment, the networking component 208 sends a command to the client 102n to close the client's port to the multicast IP address. This causes the removal of the client 102n from the common buffer group.

The server agent 202 establishes a second frame buffer channel 204' between the removed client 102n and the server agent 202 (step 308). In one embodiment, the networking component 208 establishes the second frame buffer channel 204' as described in connection with FIGS. 2B-2C. In another embodiment, the server agent 202 establishes the second channel 204'.

In one embodiment, the networking component 208 establishes the second channel 204' with the removed client 102n by addressing the client's unique IP address. In another embodiment, the networking component 208 establishes the second channel 204' with the removed client 102n by addressing the client's unique device ID on the network. In still another embodiment, the networking component 208 establishes the second channel 204' with the removed client 102n by verifying, via an attribute on the client 102n, for example, that an open port is available on the client 102n.

In one embodiment, the networking component 208 associates the removed client 102n with an unicast IP address. In another embodiment, the networking component 208 sends a command to the removed client 102n to open a second port on the unicast IP address. In still another embodiment, the networking component 208 establishes the second frame buffer channel 204' with the removed client 102n, via the second port.

In one embodiment, the method includes the step of generating, by a shared application 212 in communication with the server agent 202, a second frame buffer update 224, responsive to the detected event described above. In another embodiment, a frame panel associated with each of the plurality of associated clients 102a-102n is modified responsive to the detected event. The frame panel represents data for display on the removed client device 102n. In still another embodiment, the second frame buffer update 224, representative of the modified frame panel is generated.

The server agent 202 transmits, via the second frame buffer channel 204', a second frame buffer update 224 to the removed client 102n (step 310). In one embodiment, as described above in connection with FIG. 2B, the networking component 208 transmits the frame buffer update 224. In another embodiment, the server agent 202, in communication with an external networking component, transmits the update 224, via the external networking component and second frame buffer channel 204', to the removed client 102n.

In one embodiment, the transmitted second frame buffer update 224 differs from the first frame buffer update. In another embodiment, the transmitted second frame buffer update 224 is a re-transmission of the first frame buffer update, which may be transmitted for example, in response to a pause function to hold the display on the client device 102n.

Figure 3B:
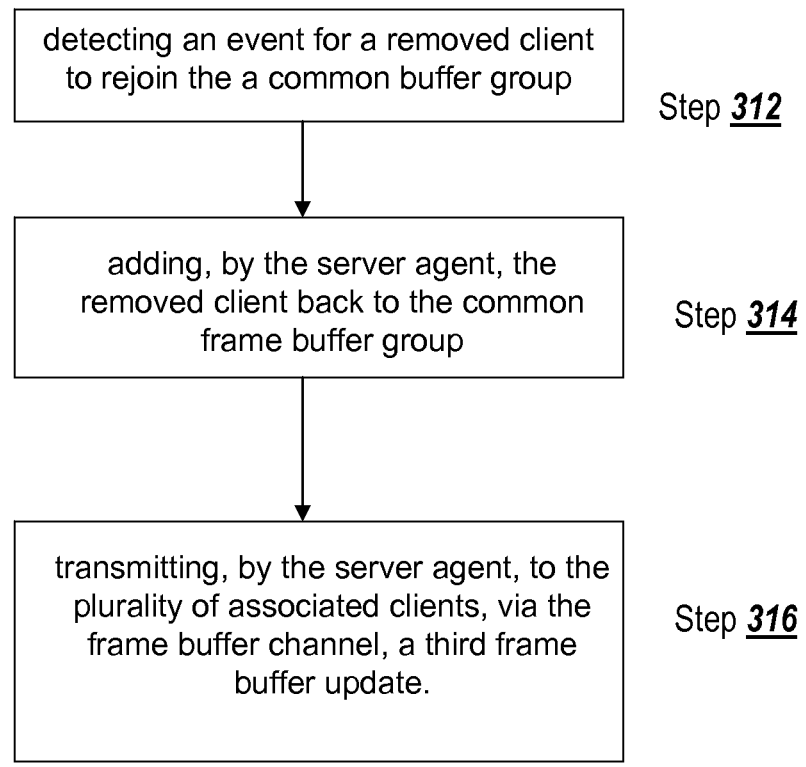
FIG. 3B is a flow diagram depicting one embodiment of the steps taken in a method for rejoining a removed client with the common frame buffer group.

Referring now to FIG. 3B, a flow diagram depicts one embodiment of the steps taken in a method for rejoining a removed client 102n with a common frame buffer group. In brief overview, the method includes the step of detecting an event for a removed client 102n to rejoin a common frame buffer group (step 312). The method includes the step of adding, by the server agent 202, the removed client 102n back to the common frame buffer group (step 314). The method includes the step of transmitting, by the server agent 202, to the plurality of associated clients 102a-102n, via the at least one frame buffer channel, a third frame buffer update 234 (step 316).

Referring now to FIG. 3B, and in greater detail, the method includes the step of detecting an event for a removed client 102n to rejoin a common frame buffer group (step 312). In one embodiment, the event indicates that the removed client 102n is ready to re-connect to the common frame buffer session. In another embodiment, the event indicates that the removed client 102n is to be disconnected from the client's dedicated session. In still another embodiment, the event indicates that the removed client's dedicated session has expired. This event can be a user event, a preprogrammed event or an administrative action, as described above in connection with FIG. 2C.

In some embodiments, an event in the shared application 212 triggers a removed client 102n to rejoin with the common frame buffer group. In one embodiment, the event is activated by a timer in the application 212' associated with the removed client 102n. In another embodiment, the event is triggered by an application time-out, for example, due to prolonged activity at the removed client 102n.

In some embodiments, an event by an entity on the network with sufficient administrative rights triggers a removed client 102n to rejoin with the common frame buffer group. In one embodiment, a sender device initiates a paging event directed to the plurality of associated clients 102a-102n. The sender device may be a server 106' or a client 102a on the network 104. In another embodiment, one of the plurality of associated clients 102n responded to the page and is removed from the common buffer group. In still another embodiment, the sender device triggers an event to terminate the page. In yet another embodiment, responsive to detecting the event, the removed client 102n will rejoin the common frame buffer group.

The server agent 202 adds the removed client 102n back to the common frame buffer group (step 314). In one embodiment, responsive to detecting the event, the networking component 208 disconnects the removed client 102n from its dedicated frame buffer channel 204'. In another embodiment, the networking component 208 adds the removed client 102n to the original frame buffer channel 204.

In one embodiment, the networking component 208 adds the removed client's device ID, such as IP address, port number or host ID, to the shared buffer group. In another embodiment, the networking component 208 adapts the subnetwork mask for the shared buffer group to include the IP address of the removed client 102n. In still another embodiment, the networking component 208 adds the IP address of the removed client 102n to the multicast IP address of the shared buffer group. In yet another embodiment, the networking component 208 sets an attribute, for example the "open port" attribute, of the removed client 102n to allow receipt of frame buffer updates for the shared buffer group. In still even another embodiment, the networking component 208 sends a command to the removed client 102n to close the port on the unicast IP address. In still another embodiment, the networking component 208 sends a command to the removed client to open a second port on the multicast IP address shared by the common buffer group.

The server agent 202 transmits a third frame buffer update 234, via the at least one frame buffer channel 204, to the plurality of associated clients 102a-102n (step 316). In one embodiment, the networking component 208 transmits the third frame buffer update 234, to re-synchronize the plurality of associated clients 102a-102n. In another embodiment, the transmitted third frame buffer update 234 is a re-send of the last common update, to update the display of the previously removed client 102n with respect to the common buffer group. In still another embodiment, the transmitted third frame buffer update 234 is a new update.

In some embodiments of the methods described in connection with FIGS. 3A and 3B, the methods include the steps of executing a frame buffer client by each of the plurality of associated clients 102a-102n. The methods include the step of generating a display with the frame buffer client. The methods include the step of updating the display in response to receiving a frame buffer update from the server agent 202.

The following illustrative examples show how the methods and systems discussed above may be used for establishing a dedicated session for a member of a common frame buffer group. These examples are meant to illustrate and not to limit the invention.

EXAMPLE 1

In one embodiment of the methods and systems described above, a gateway delivers voice office applications to Voice over IP (VoIP) phones in a zone paging system. In another embodiment, the networking component 208 and the server agent 202 reside in the gateway and the plurality of clients 102a-102n are VoIP phones. In still another embodiment, zone paging VoIP applications allow for grouping of phones into zones, and allow for individual phones in the zone to send and receive zone pages, in addition to the typical voice functions transmitted over a voice path. In still even another embodiment, the gateway redirects a zone page from a sender to a plurality of clients 102a-102n during a paging event. In another embodiment, the gateway application includes an application user interface (UI) providing, by a JAVA component, JAVA Swing-based frame panels, which are displayed to the plurality of clients 102a-102n. In yet another embodiment, the JAVA component includes the shared application 212 and the frame buffer generator 220, generates the frame buffer updates and sends frame buffer updates to the server agent 202 for transmission to the plurality of clients 102a-102n.

In one embodiment, a dedicated frame buffer connection is used to send frame buffer updates to the clients 102a-102n when there is a change in the shared application 212. For example, a change may be a change from one UI panel to another panel, the change made in response to a click on a button in the panel, or in response to an incoming page. In another embodiment, a change on the UI maintained by the server agent 202 is automatically reflected on a client 102n. In another embodiment, the server agent 202 on the gateway acts as a relay and transfers frame buffer updates between the clients 102a-102n and the gateway. In still another embodiment, the gateway maintains a shared application 212 for a zone (e.g., a plurality of associated clients) and the shared application 212 is updated when a page occurs in the zone.

In one embodiment, the client 102 executes a frame buffer client and displays data received in a frame buffer update over the frame buffer channel 204 from the gateway. In another embodiment, the gateway performs the application processing on behalf of the clients 102a-102n. In still another embodiment, a channel between the clients 102a-102n and the gateway is used to send commands to the clients 102a-102n. In some embodiments, a command to a client 102 may include instructions to the client 102 to activate a speaker so that users of the client 102 may listen to an audio stream including an incoming page. In other embodiments, the command may include instructions to the client 102 to activate a microphone so that a user of the client 102 may input an audio stream (which may include outgoing pages) for transmission to the gateway.

In one embodiment, zone-paging is invoked by a client 102a to send a page to at least one client 102b by selecting an element in a user interface panel displayed to the client 102a. In another embodiment, a mouse click is transmitted to the shared application 212 executing in the gateway. In still another embodiment, a JAVA Swing object panel in the shared application 212 is updated in response to the mouse event, resulting in the generation of a frame buffer update by the frame buffer generator 220. In yet another embodiment, the frame buffer update is transmitted to the at least one client 102b. In still even another embodiment, the at least one client 102b, responsive to the frame buffer update, updates its display with the new frame panel, indicating, to a user, that the page is in progress or displaying the contents of the page.

In one embodiment, the gateway uses a single frame buffer channel 204 to transmit data to a plurality of clients 102a-102n in a zone group. In another embodiment, the gateway instructs a plurality of clients 102a-102n to monitor a multicast IP address to which frame buffer updates may be transmitted. In another embodiment, when a mouse click event occurs on any one of the clients 102a-102n (e.g., any one of N VoIP phones) while a zone page is in progress—for example, a mouse event indicating that a user wishes to stop the page on the user's client 102n—this event will result in a change on a display of the client 102n. In still another embodiment, responsive to a mouse event, a separate JAVA Swing application instance 212' is created in the gateway, and a new frame buffer channel 204' for the client 102n is established. In yet another embodiment, responsive to the mouse event, the server agent 202 assigns a new IP address for the requesting client 102n so as to differentiate it from the common buffer group using the common multicast IP address. At that point, there would be two different JAVA Swing instances and two sets of frame buffer updates transmitted, one for the plurality of associated clients and one for the removed client 102n.

In one embodiment, a second click from a client 102b results in a separation of that client 102b from the common frame buffer group, resulting in three different JAVA Swing applications instances—one for the plurality of associated clients, one for the removed client 102n, and one for the client 102b. In another embodiment, however, the likelihood of each client in the plurality of associated clients sending an event while a zone page is in progress is substantially small, and hence use of the methods and systems described herein may result in a performance improvement for each of the plurality of clients 102a-102n. In still another embodiment, use of the methods and systems described herein may result in reduced latency for displaying updates on each of the plurality of clients 102a-102n.

EXAMPLE 2

In one embodiment of the methods and systems described above, a web server 106 transmits a first set of data across a network to a plurality of clients 102a-102n connected to a webcast session. In another embodiment, the data set includes application output data. In still another embodiment, the data set includes graphical data for display on each of the plurality of clients 102a-102n. In still even another embodiment, the data set includes data transmitted according to a presentation layer protocol to a software application on each of the plurality of clients 102a-102n. In yet another embodiment, the data set includes images and text forming a web-based presentation displayed to the plurality of clients 102a-n.

In one embodiment, the server 106 receives a mouse click from a client computer 102n; for example, a user may click on a user interface element in order to request that the server halt the transmission of presentation data to the client. In another embodiment, the mouse click is transmitted as a system call from the client 102n, across a network, to the server 106. In still another embodiment, the mouse click is detected by the client 102n and an identification of a user event is transmitted to the server 106.

In one embodiment, responsive to the user event (e.g., the mouse click), the server 106 removes the requesting client 102n from the shared webcast group. In another embodiment, responsive to the user event, the server 106 establishes a new webcast channel 204' for the requesting client 102n. In still another embodiment, responsive to the user event, the server 106 re-transmits the last image transmitted before the request was detected. In still even another embodiment, responsive to the user event, the server 106 sends a second frame buffer update 224 including the last image transmitted to the client 102n and an indication that the presentation of data to the client 102n has been paused (for example, a symbol or icon for display on the client 102n). In yet another embodiment, a dedicated session is thus established to serve the requesting client computer 102n. In some embodiments, to rejoin the shared webcast session, the requesting client can transmit a second user event, such as a second mouse click on a user interface element displayed by the client 102n, to make the request.

EXAMPLE 3

In one embodiment of the methods and systems described above, an in-flight entertainment system includes a server 106 transmitting a first video stream to a group of passenger display terminals 102a-102n. In another embodiment, the server 106 detects a request, from one passenger display terminal 102n, to change video channels, the request activated by a button on a remote controller device associated with the passenger display terminal 102n. In still another embodiment, responsive to the button event, the server 106 removes the passenger display terminal from the shared video group. In still even another embodiment, responsive to the button event, the server 106 establishes a new video streaming channel 204' to the passenger display terminal 102n. In yet another embodiment, responsive to the button event, a new video stream is generated from the server 106, and transmitted to the passenger terminal 102n.

EXAMPLE 4

In one embodiment of the methods and systems described above, a multimedia server 106 transmits streaming video and audio content across the Internet to multiple client computers 102a-102n subscribed to a streaming service. In another embodiment, the server 106 initiates the streaming transmission by sending a command to client computers 102a-n subscribed to the streaming service to open a port and monitor for traffic addressed to a multicast IP address. In still another embodiment, the server 106 receives a notification event from an application on the server 106 indicating that a client subscription has expired, and directs the associated client computer 102n to close the port and cease monitoring for traffic addressed to the multicast IP address. In still even another embodiment, the server 106 directs the removed client computer 102n to open a second port and monitor for traffic addressed to a unicast IP address, establishing a channel which transmits a user interface providing an option to re-subscribe to the service. In another embodiment, a user of the removed client 102n re-subscribes to the service, and confirms this action with a mouse click to a user interface element in the user interface. In yet another embodiment, responsive to the mouse event, the server 106 redirects the removed client computer 102n to close the port and cease monitoring for traffic addressed to the unicast IP address and open a third port and begin monitoring for traffic addressed to the multicast IP address in order to resume access to the streaming content.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for establishing a dedicated session for a member of a common frame buffer group, it will now become apparent to one of skill in the art that other embodiments incorporating the concepts of the disclosure may be used.

What is claimed is:

1. A method for establishing a dedicated session for a member of a common frame buffer group, the method comprising the steps of:
   (a) transmitting, by a server agent, via at least one frame buffer channel, a first frame buffer update of frame buffer updates to each of a plurality of associated clients of a common frame buffer group receiving the frame buffer updates from a shared application executing on the server;
   (b) detecting an event representative of a user interaction via one of a click or keyword input to the shared application and generated by one of the plurality of associated clients, wherein the event triggers generation of a second frame buffer update;
   (c) removing, by the server agent responsive to detection of the event, the one of the plurality of associated clients from the plurality of associated clients of the common frame buffer group receiving frame buffer updates from the at least one frame buffer by resetting an attribute of the one of the plurality of associated clients to block the one of the plurality of associated clients from receiving frame buffer updates transmitted to the common frame buffer group via the at least one frame buffer channel;
   (d) establishing, by the server agent responsive to detection of the event, a new second frame buffer channel between the removed one of the plurality of associated clients and the server agent by addressing one of a unique internet protocol (IP) address or device identifier of the removed one of the plurality of associated clients, the second frame buffer channel providing a dedicated session between the removed one of the plurality of associated clients and the shared application; and
   (e) transmitting, by the server agent, to the removed one of the plurality of associated clients, via the second frame buffer channel, the second frame buffer update that provides an update from the shared application to only the one of the plurality of associated clients based on the user interaction of the one of the plurality of associated clients.

2. The method of claim 1 further comprising the steps of:
   (f) adding, the removed one of the plurality of associated clients, to the plurality of associated clients; and
   (g) transmitting a third frame buffer update to the plurality of associated clients via the at least one frame buffer channel.

3. The method of claim 1, wherein step (a) further comprises multicasting, by a server agent, via at least one frame buffer channel, a first frame buffer update to each of a plurality of associated clients.

4. The method of claim 1, wherein step (a) further comprises transmitting, by the server agent, via a plurality of frame buffer channels, the first frame buffer update to each of the plurality of associated clients, each of the plurality of frame buffer channels established between one of the plurality of associated clients and the server agent.

5. The method of claim 1 further comprising the step of transmitting, by the server agent, to each of the plurality of associated clients, via the at least one frame buffer channel, a frame buffer update representative of a paging event.

6. The method of claim 5, wherein step (b) further comprises detecting a first event comprising a response to the paging event.

7. The method of claim 1, wherein step (c) further comprises removing an Internet protocol address associated with the removed one of the plurality of associated clients from a multicast Internet protocol address.

8. The method of claim 1 further comprising the step of receiving, by the server agent, a frame buffer update generated by an application in communication with the server agent, the frame buffer update representative of output data generated by the application.

9. The method of claim 1 further comprising the step of modifying a frame panel associated with each of the plurality of associated clients, responsive to the detection of the event.

10. The method of claim 9 further comprising the step of generating the second frame buffer update representative of the modified frame panel.

11. The method of claim 1 further comprising the step of generating, by an application in communication with the server agent, the second frame buffer update, responsive to the detected event.

12. The method of claim 1 further comprising the step of receiving, by the server agent, an event representative of user interaction with one of the plurality of associated clients.

13. The method of claim 1, further comprising the steps of:
(f) executing, by each of the plurality of associated clients, a frame buffer client;
(g) generating a display with the frame buffer client; and
(h) updating the display, responsive to receiving, from the server agent, a frame buffer update.

14. The method of claim 1 further comprising the step of transmitting, by the server agent, to an application, an event generated by a client in the plurality of associated clients via a frame buffer channel between the server agent and the application.

15. A system for establishing a dedicated session for a member of a common frame buffer group comprising:
a processor;
a server agent executing on the processor to perform;
establishing at least one frame buffer channel with each of a plurality of associated clients of a common frame buffer group receiving frame buffer updates from a shared application executing on the server;
transmitting via the at least one frame buffer channel, a first frame buffer update of the frame buffer updates to each of the plurality of associated clients of the common frame buffer group receiving the frame buffer updates from the shared application executing on the server;
detecting an event representative of a user interaction via one of a click or keyword input to the shared application and generated by one of the plurality of associated clients, wherein the event triggers generation of a second frame buffer update;
removing, responsive to detection of the event, the one of the plurality of associated clients from the plurality of associated clients of the common frame buffer group receiving frame buffer updates from the at least one frame buffer by resetting an attribute of the one of the plurality of associated clients to block the one of the plurality of associated clients from receiving frame buffer updates transmitted to the common frame buffer group via the at least one frame buffer channel;
establishing, responsive to detection of the event, with the removed one of the plurality of associated clients, a new second frame buffer channel, addressing one of a unique internet protocol (IP) address or device identifier of the removed one of the plurality of associated clients, the second frame buffer channel providing a dedicated session between the removed one of the plurality of associated clients and the shared application; and
transmitting, via the second frame buffer channel, the second frame buffer update providing a frame buffer update from the shared application to only the one of the plurality of associated clients based on the user interaction of the one of the plurality of associated clients.

16. The system of claim 15, wherein the server agent executes on an application gateway.

17. The system of claim 15, wherein the server agent executes on a server.

18. The system of claim 15 further comprising a frame buffer generator, in communication with the server agent, generating the at least one frame buffer update.

19. The system of claim 15 further comprising a frame buffer generator identifying an event representative of user interaction with one of the plurality of associated clients.

20. The system of claim 15 further comprising a plurality of frame buffer channels, each of the plurality of frame buffer channels established between one of the plurality of associated clients and the server agent.

21. The system of claim 15 further comprising a frame buffer update representative of a paging event.

22. The system of claim 15 further comprising a frame buffer update representative of output data generated by an application in communication with the server agent.

23. The system of claim 15 further comprising a frame buffer client executing on each of the plurality of associated clients and generating a display updated responsive to receiving, from the server agent, a frame buffer update.

* * * * *